United States Patent
Lei

(10) Patent No.: US 10,810,287 B2
(45) Date of Patent: Oct. 20, 2020

(54) METHOD AND APPARATUS FOR UNLOCKING TERMINAL SCREEN

(71) Applicant: BAIDU ONLINE NETWORK TECHNOLOGY (BEIJING) CO., LTD., Beijing (CN)

(72) Inventor: Zhihai Lei, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/160,931

(22) Filed: Oct. 15, 2018

(65) Prior Publication Data

US 2019/0050544 A1 Feb. 14, 2019

Related U.S. Application Data

(63) Continuation of application No. PCT/CN2017/000040, filed on Jan. 3, 2017.

(30) Foreign Application Priority Data

Jul. 19, 2016 (CN) .......................... 2016 1 0569859

(51) Int. Cl.
  *G06F 21/00* (2013.01)
  *G06F 21/31* (2013.01)
  (Continued)

(52) U.S. Cl.
  CPC .............. *G06F 21/31* (2013.01); *G06F 3/02* (2013.01); *G06F 3/0304* (2013.01); *G06F 21/74* (2013.01); *G06F 3/167* (2013.01)

(58) Field of Classification Search
  CPC . G06F 21/31; G06F 21/74; G06F 3/02; G06F 3/0304; G06F 3/167
  See application file for complete search history.

(56) References Cited

U.S. PATENT DOCUMENTS 4,721,976 A * 1/1988 Aihara ................... G03B 7/089
  396/234
5,594,238 A * 1/1997 Endruschat ............. E03C 1/057
  250/214 B
(Continued)

FOREIGN PATENT DOCUMENTS

CN  101567935 A  10/2009
CN  102340590 A   2/2012
(Continued)

OTHER PUBLICATIONS

International Search Report for PCT/CN2017/000040, dated Apr. 24, 2017.

(Continued)

*Primary Examiner* — Sarah Su
(74) *Attorney, Agent, or Firm* — Marshall, Gerstein & Borun LLP

(57) ABSTRACT

A method and apparatus for unlocking a terminal screen are provided. A specific embodiment of the method includes: determining a current screen state of the terminal being a state of awaiting unlocking; acquiring illumination information of an environment of the terminal in a predetermined period of time, the illumination information comprising an illumination intensity and a duration of the illumination intensity; judging whether the illumination information meets a predetermined condition; and switching the current screen state of the terminal to a successfully unlocked state in response to determining that the illumination information meets the predetermined condition. The embodiment achieves high-precision unlocking of a terminal screen without the need of manual operations on the terminal screen.

7 Claims, 5 Drawing Sheets

(51) Int. Cl.
*G06F 3/03* (2006.01)
*G06F 21/74* (2013.01)
*G06F 3/02* (2006.01)
*G06F 3/16* (2006.01)

(56) References Cited

U.S. PATENT DOCUMENTS

| | | | | |
|---|---|---|---|---|
| 10,437,972 B2* | 10/2019 | Tang | ............ | G06F 21/32 |
| 2007/0156364 A1* | 7/2007 | Rothkopf | ............ | G06F 1/1684 |
| | | | | 702/117 |
| 2007/0161410 A1* | 7/2007 | Huang | ............ | H04M 1/66 |
| | | | | 455/565 |
| 2010/0085562 A1* | 4/2010 | Duffy, III | ............ | G07C 9/00182 |
| | | | | 356/239.2 |
| 2013/0009858 A1* | 1/2013 | Lacey | ............ | G06F 1/1643 |
| | | | | 345/156 |
| 2013/0127706 A1 | 5/2013 | Hsu et al. | | |
| 2013/0265135 A1* | 10/2013 | Chang | ............ | G06F 21/36 |
| | | | | 340/5.51 |
| 2014/0120891 A1* | 5/2014 | Chen | ............ | G06F 3/0487 |
| | | | | 455/418 |
| 2015/0011195 A1* | 1/2015 | Li | ............ | H03G 3/3026 |
| | | | | 455/418 |
| 2015/0015688 A1* | 1/2015 | Yang | ............ | G06F 21/32 |
| | | | | 348/77 |
| 2016/0011661 A1* | 1/2016 | Tanaka | ............ | G06F 3/0346 |
| | | | | 345/589 |
| 2016/0063847 A1* | 3/2016 | Hawkins | ............ | G08B 21/24 |
| | | | | 340/539.11 |
| 2016/0374177 A1* | 12/2016 | Chen | ............ | H05B 37/0218 |
| 2017/0134891 A1* | 5/2017 | Gettings | ............ | H04W 4/023 |
| 2017/0187866 A1* | 6/2017 | Li | ............ | H04M 1/72572 |
| 2017/0294175 A1* | 10/2017 | Chen | ............ | G06F 3/14 |
| 2017/0344255 A1* | 11/2017 | Xie | ............ | G06F 3/0487 |
| 2017/0347415 A1* | 11/2017 | Cho | ............ | H05B 33/0815 |
| 2018/0204058 A1* | 7/2018 | Yoo | ............ | G06K 9/00597 |
| 2018/0268121 A1* | 9/2018 | Zhou | ............ | G06F 21/32 |
| 2018/0270752 A1* | 9/2018 | Wang | ............ | G06F 1/3265 |
| 2019/0050544 A1* | 2/2019 | Lei | ............ | G06F 21/31 |
| 2019/0258320 A1* | 8/2019 | Yang | ............ | G06F 3/017 |

FOREIGN PATENT DOCUMENTS

| | | |
|---|---|---|
| CN | 102868821 A | 1/2013 |
| CN | 103581443 A | 2/2014 |
| CN | 103593115 A | 2/2014 |
| CN | 105956437 A | 9/2016 |

OTHER PUBLICATIONS

UsefullCode.net, Jan. 21, 2011, retrieved Oct. 28, 2019, http://www.usefullcode.net/2011/01/android_sdk_1.html.

* cited by examiner

METHOD AND APPARATUS FOR UNLOCKING TERMINAL SCREEN

CROSS-REFERENCE TO RELATED APPLICATIONS

This application is a continuation of International Application PCT/CN2017/000040, with an international filing date of Jan. 3, 2017, which claims priority to Chinese Patent Application no. 201610569859.3, filed in China on Jul. 19, 2016, the contents of which are incorporated herein by reference in their entirety.

TECHNICAL FIELD

The disclosure relates to the field of intelligent terminal technology, specifically to the field of intelligent terminal application technology, and more specifically to a method and apparatus for unlocking a terminal screen.

BACKGROUND

At present, intelligent terminals have become a part of daily life, and many users achieve the goal of protecting privacy, preventing misoperations, and saving power by screen locking. The user needs to unlock the screen of an intelligent terminal before using the intelligent terminal.

The existing approaches for unlocking a terminal screen include slide-to-unlock, unlocking by entering a text password, unlocking with face recognition, unlocking with a fingerprint, and unlocking by drawing a pattern on a dot matrix. In the approaches for unlocking a terminal screen, such as slide-to-unlock, unlocking by entering a text password, unlocking with face recognition, unlocking with a fingerprint, or unlocking by drawing a pattern on a dot matrix, it is necessary to manually operate the terminal screen.

However, for example, when the ambient temperature is low, it is inconvenient to operate the terminal screen with a finger. At the same time, the success rate of unlocking a terminal screen with face recognition is low.

SUMMARY

An object of the disclosure is to provide an improved method and apparatus for unlocking a terminal screen, to solve a part of the technical problems mentioned in the Background.

In a first aspect, the disclosure provides a method for unlocking a terminal screen. The method includes: determining a current screen state of the terminal being a state of awaiting unlocking; acquiring illumination information of an environment of the terminal in a predetermined period of time, the illumination information including an illumination intensity and a duration of the illumination intensity; judging whether the illumination information meets a predetermined condition; and switching the current screen state of the terminal to a successfully unlocked state in response to determining that the illumination information meets the predetermined condition.

In a second aspect, the disclosure provides an apparatus for unlocking a terminal screen. The apparatus includes: a determination unit, configured for determining a current screen state of the terminal being a state of awaiting unlocking; an acquisition unit, configured for acquiring illumination information of an environment of the terminal in a predetermined period of time, the illumination information including an illumination intensity and a duration of the illumination intensity; a judging unit, configured for judging whether the illumination information meets a predetermined condition; and an execution unit, configured for switching the current screen state of the terminal to a successfully unlocked state in response to determining that the illumination information meets the predetermined condition.

The method and apparatus for unlocking a terminal screen provided by the disclosure determine a current screen state of the terminal being a state of awaiting unlocking; then acquire illumination information of an environment of the terminal in a predetermined period of time, the illumination information including an illumination intensity and a duration of the illumination intensity; then judge whether the illumination information meets a predetermined condition; and switch the current screen state of the terminal to a successfully unlocked state in response to determining that the illumination information meets the predetermined condition, thereby achieving high-precision unlocking of a screen without or with a few manual operations on the terminal screen, and enriching the user experience.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
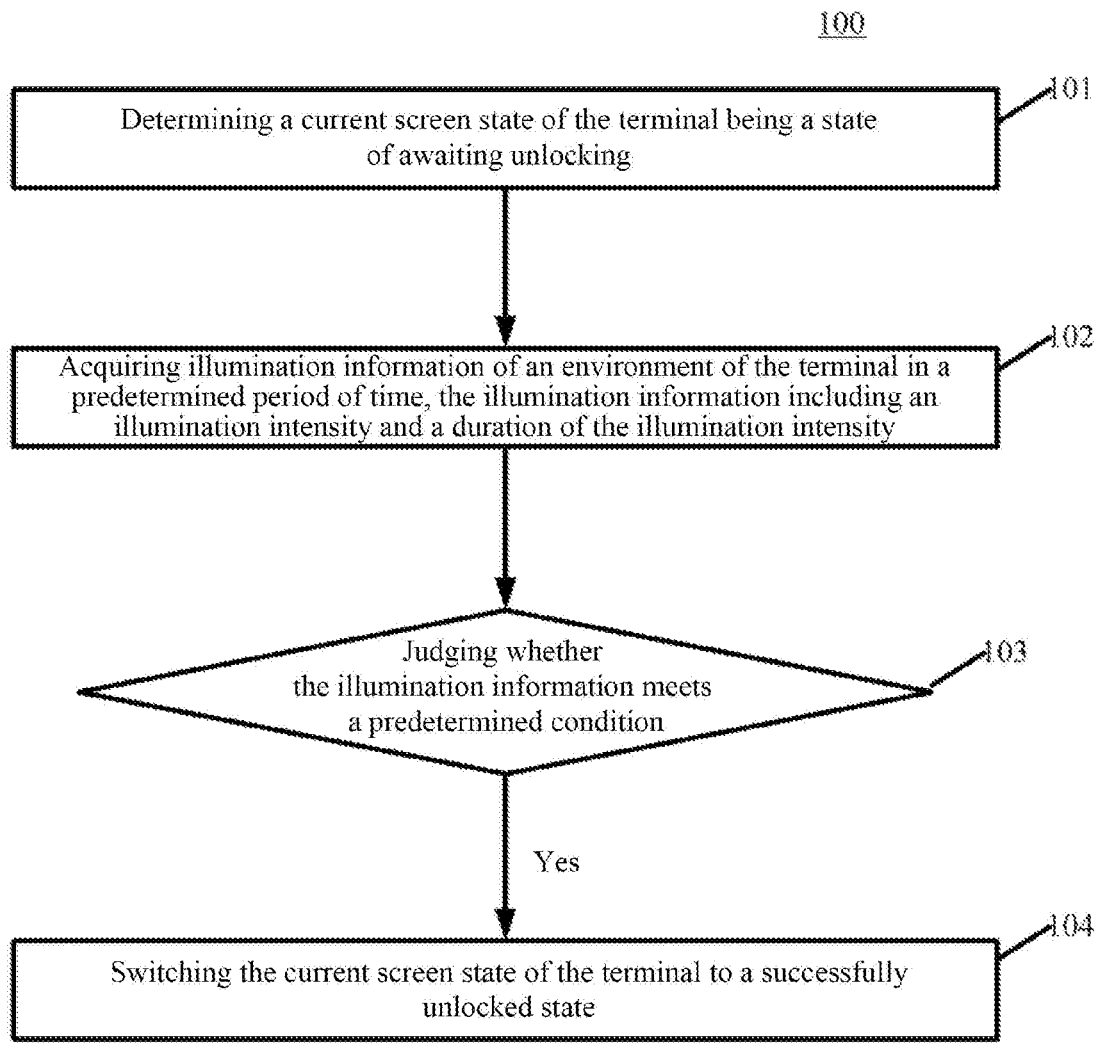
FIG. 1 is a process diagram of an embodiment of a method for unlocking a terminal screen according to the disclosure.

Please refer to FIG. 1, which shows a process 100 of an embodiment of a method for unlocking a terminal screen according to the disclosure. The method for unlocking a terminal screen includes:

Step 101: determining a current screen state of the terminal being a state of awaiting unlocking.

In some embodiments, the terminal may be a variety of electronic devices having a display screen, including but not limited to smart phones, tablet computers, e-book readers, laptop computers, and desk computers.

In some embodiments, the terminal state may include, for example, a successfully unlocked state and a state of awaiting unlocking. The state of awaiting unlocking may be a state of a locked screen. The state of the locked screen may be a state of a blank screen, i.e., a locked screen in a state when the screen is turned off, or a locked screen in a state when the screen is turned on.

In some embodiments, the terminal first determines a current screen state of the terminal being a state of awaiting unlocking. For example, whether the current state of the terminal is a state of awaiting unlocking may be known based on current power consumption of the screen of the terminal. For example, when the current power consumption of the screen is less than a specific value, then the current screen state of the terminal being a state of awaiting unlocking may be determined.

In some optional implementations of the embodiment, the terminal system may determine whether the current state is a state of awaiting unlocking by, for example, invoking an underlying function in response to a first operation of a user on the terminal. Here, the first operation may be, for example, a pressing operation of the user on a power button. Alternatively, the first operation may further be, for example, a voice inputted by a user into the terminal via an audio input device of the terminal, and the voice may contain a few phonetic symbols, a plurality of phonetic symbols, or the like. The underlying function may be, for example, a screen locking/unlocking function provided by a system. The system may invoke the screen locking/unlocking function provided by the system, and judge whether the current screen is in a state of awaiting unlocking based on a return value of the screen locking/unlocking function. For example, when the system of the terminal is an Android system, the terminal may use an inKeyguardRestrictedInputMode function in a Keyguardmanager category, and judge whether the terminal screen is in a state of awaiting unlocking based on a return value of the function. When a flag return value acquired using the inKeyguardRestrictedInputMode function is a predetermined return value "true," the current state of the terminal screen being the state of awaiting unlocking is determined. There are two states of awaiting unlocking: a, the screen is turned off, and the terminal screen is in the state of awaiting unlocking; and b, the screen is turned on, and the terminal screen is in the state of awaiting unlocking. When the flag return value acquired using the method is "false," the current state of the terminal screen being in a successfully unlocked state is determined. As mentioned above, the inKeyguardRestrictedInputMode method is a well-known technology that is widely used at present, and is not repeated any more here.

Step 102: acquiring illumination information of an environment of the terminal in a predetermined period of time.

At present, a plurality of sensors is installed on most intelligent mobile terminals, and corresponding information of the mobile terminal is detected by the various sensors. For example, illumination information of the environment may be collected by a light sensor. The illumination information may include an illumination intensity and a duration of the illumination intensity.

In some optional implementations of the embodiment, the terminal first registers a monitor monitoring a parameter change event of the light sensor in the system thereof. Taking an operating system running on the terminal being an Android operating system as an example, after registering a monitor monitoring a parameter change event of the light sensor in the system, when the system is running, the kernel of the Android operating system will monitor parameters of the light sensor, and will generate a broadcast message indicating a parameter change of the sensor when monitoring the parameter change of the light sensor. The registered monitor receives the broadcast message. In some embodiments, the ambient light intensity change will cause a parameter change of the light sensor of the terminal, and accordingly, the kernel of the operating system will send the broadcast message of the parameter change of the light sensor. Therefore, in some embodiments, the monitor may receive the broadcast message indicating the parameter change of the light sensor of the terminal in real time. When receiving the broadcast message of the change of the light sensor, the monitor may acquire the illumination intensity of the environment of the terminal detected by the light sensor. Specifically, the monitor may acquire the illumination intensity of the environment of the terminal detected by the light sensor by invoking an application programming interface (API) of the light sensor provided by the operating system running on the terminal. The monitor transfers the acquired illumination intensity to the terminal.

Furthermore, the light sensor may further detect durations of different illumination intensities. The monitor may further acquire a duration of each illumination intensity by the API, and transfer the durations to the terminal.

In some optional implementations of the embodiment, the illumination intensity of the environment of the terminal may change a plurality of times in a predetermined period of time. The terminal may acquire a plurality of illumination intensities, and the durations of the illumination intensities in the predetermined period of time by the monitor. Here, the predetermined period of time may be, for example, 10 seconds. In addition, the predetermined period of time may be set based on actual needs, and is not limited here.

Step 103: judging whether the illumination information meets a predetermined condition.

In some optional implementations of the embodiment, the predetermined condition may be change regularity preset by a user in the terminal. The change regularity may include, for example, two-dimensional values indicating relative illumination intensity changes and durations thereof, such as alternating values "0" and "1." The "1" here may represent, for example, an illumination intensity greater than a preset threshold. The "0" here may represent, for example, an illumination intensity smaller than a preset threshold. The threshold may be set based on an actual service environment, and is not limited here. Furthermore, the change regularity may also be change regularity reflected by a plurality of illumination intensities pre-stored in the terminal and set by the user.

In some embodiments, first, the change regularity of the illumination intensity is collected based on the plurality of illumination intensities and the durations of the illumination intensities acquired in the step 102. Likewise, when collecting the change regularity of the illumination intensity, illumination intensities greater than the preset threshold may be regarded as "1," while illumination intensities smaller than the preset threshold may be regarded as "0." Then, whether the change regularity of the illumination intensity matches the change regularity preset by the user is further judged. The illumination information meets the predetermined condition when the change regularity of the illumination intensity collected based on the plurality of illumination intensities and the durations of the illumination intensities acquired in the predetermined period of time matches the change regularity preset by the user. Otherwise, the illumination information fails to meet the predetermined condition.

Step 104: switching the current screen state of the terminal to a successfully unlocked state in response to determining that the illumination information meets the predetermined condition.

When the terminal determines the illumination information meeting the predetermined condition, the current screen state of awaiting unlocking is switched to a successfully unlocked state, for using the terminal screen by the user.

When the illumination information of the terminal fails to meet the predetermined condition, the current screen state of the terminal being a state of awaiting unlocking is maintained.

The method for unlocking a terminal screen provided by the embodiment determines a current screen state of the terminal being a state of awaiting unlocking, then acquires illumination information of an environment of the terminal in a predetermined period of time, the illumination information including an illumination intensity and a duration of the illumination intensity, and then judges whether the illumination information meets a predetermined condition, and switches the current screen state of the terminal to a successfully unlocked state in response to determining that the illumination information meets the predetermined condition. The method provided by the embodiment can realize intelligent unlocking of a terminal through illumination intensity changes of the environment of the terminal without the need for manual operation of the user, whilst enriching the user experience.

Figure 2:
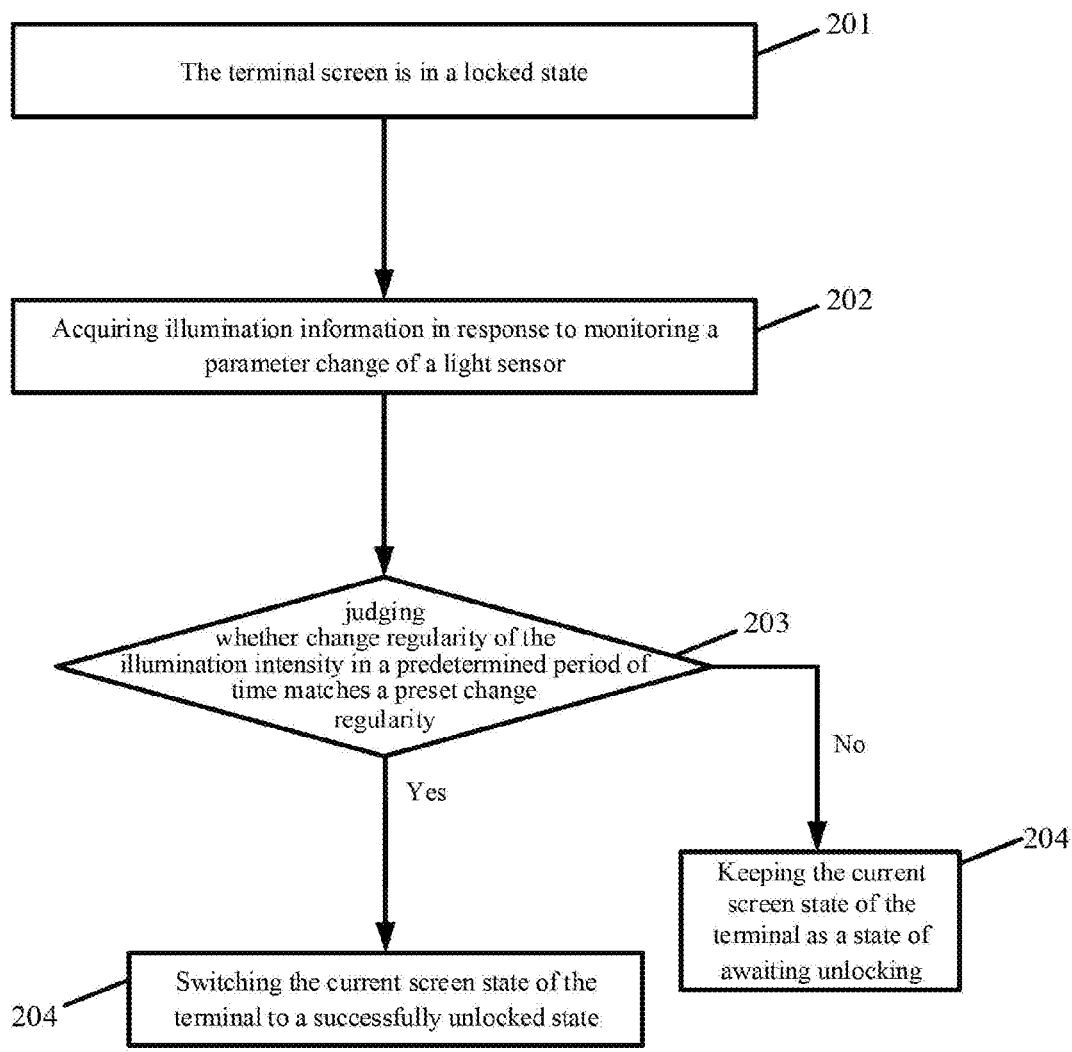
FIG. 2 is a schematic process diagram of a method for unlocking a terminal screen according to the disclosure.

Please further refer to FIG. 2. FIG. 2 is a schematic process diagram of a method for unlocking a terminal screen according to the disclosure. As shown in FIG. 2, in step 201, the terminal is in a state of a locked screen. The state of the locked screen includes a locked state when the screen is turned on, or a locked state when the screen is turned off. Step 202: monitoring a parameter change of a light sensor to acquire illumination information. For example, a monitor registered in the system may monitor a parameter change of the light sensor by monitoring a broadcast of the parameter change of the light sensor issued from the kernel, thereby acquiring illumination information of the environment of the terminal. The illumination information includes an illumination intensity and a duration of the illumination intensity. The monitor transfers the acquired illumination information to a relevant application in the terminal. Step 203: judging whether change regularity of the illumination intensity in a predetermined period of time matches a preset change regularity. Step 204: switching the current screen state of the terminal to a successfully unlocked state when the change regularity of the illumination intensity in a predetermined period of time matches a preset change regularity, and otherwise, keeping the current screen state of the terminal as a state of awaiting unlocking.

Figure 3:
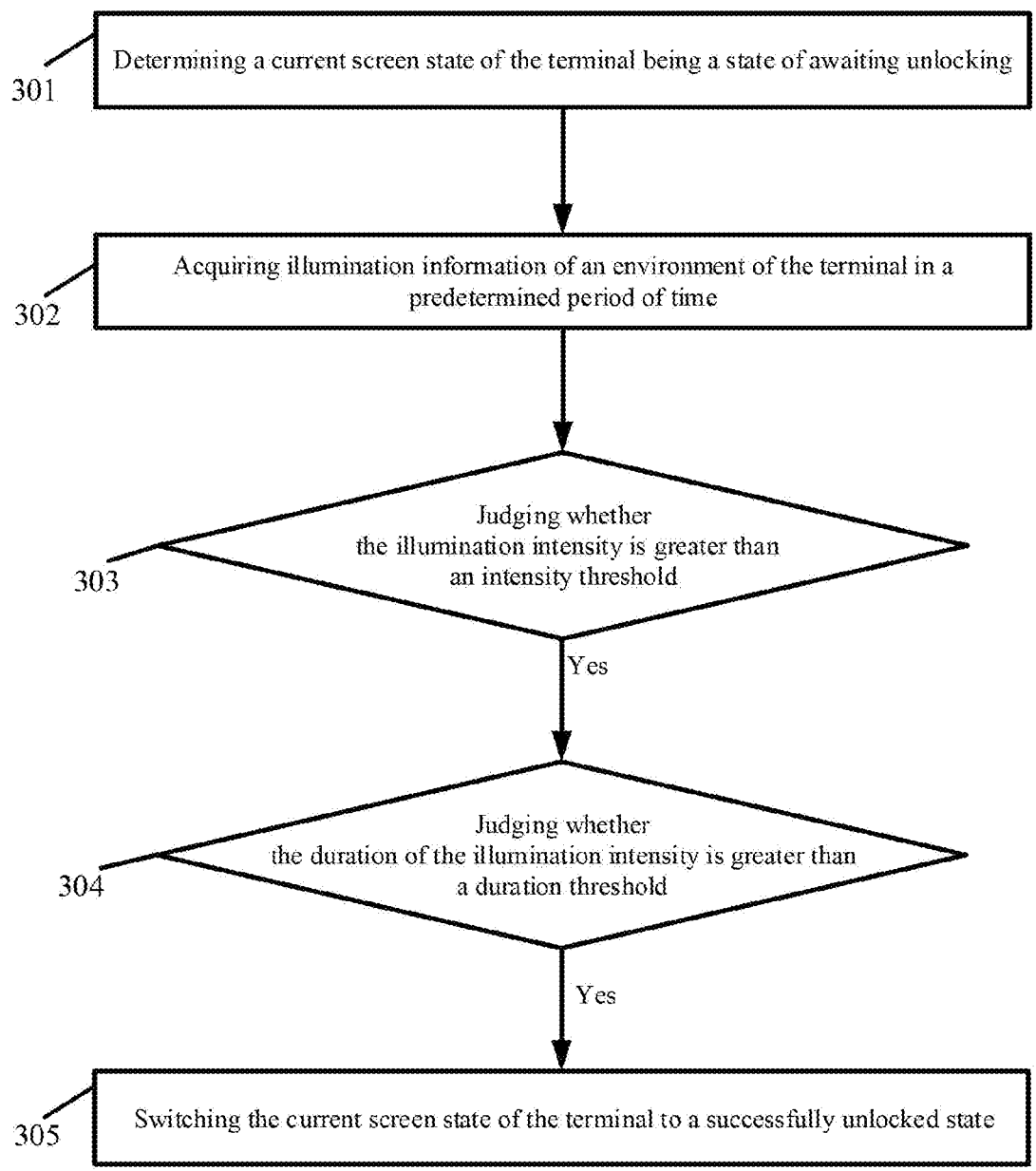
FIG. 3 is a process diagram of another embodiment of a method for unlocking a terminal screen according to the disclosure.

Further referring to FIG. 3, a process 300 of another embodiment of a method for unlocking a terminal screen according to the disclosure is shown. The method for unlocking a terminal screen includes:

Step 301: determining a current screen state of the terminal being a state of awaiting unlocking.

In some optional implementations of the embodiment, the terminal system may determine whether the current state is a state of awaiting unlocking by, for example, invoking an underlying function in response to a first operation of a user on the terminal. Here, the first operation may be, for example, a pressing operation of the user on a power button. Alternatively, the first operation may further be, for example, a voice inputted by a user into the terminal via an audio input device of the terminal, and the voice may contain a few phonetic symbols, a plurality of phonetic symbols, or the like. The underlying function may be, for example, a screen locking/unlocking function provided by a system. The system may invoke the screen locking/unlocking function provided by the system, and judge whether the current screen is in a state of awaiting unlocking based on a return value of the screen locking/unlocking function. For example, when the system of the terminal is an Android system, the terminal may use an inKeyguardRestrictedInputMode function in a Keyguardmanager category, and judge whether the terminal screen is in a state of awaiting unlocking based on a return value of the function. For example, when a flag return value acquired using an inKeyguardRestrictedInputMode function is a predetermined return value "true," it denotes the terminal screen being in the state of awaiting unlocking. There are two states of awaiting unlocking: a, the screen is turned off, and the terminal screen is in the state of awaiting unlocking; and b, the screen is turned on, and the terminal screen is in the state of awaiting unlocking. When the flag return value acquired using the method is "false," it denotes the terminal screen being in a successfully unlocked state.

Step 302: acquiring illumination information of an environment of the terminal in a predetermined period of time.

In some embodiments, illumination information of an environment of the terminal may be collected by a light sensor arranged in the terminal. The illumination information may include an illumination intensity and a duration of the illumination intensity.

In some embodiments, the system running on the terminal monitors a parameter change of the light sensor, and issues a broadcast message to a monitor pre-registered in the system in case of the parameter change. The monitor may acquire the illumination intensity detected by the light sensor by an application programming interface (API) of the light sensor provided by the operating system.

In some embodiments, the illumination information may further include a duration of the illumination intensity. The duration of each illumination intensity may be collected by, for example, the light sensor.

Step 303: judging whether the illumination intensity is greater than an intensity threshold.

In some embodiments, the intensity threshold set by the user may be pre-stored in the terminal. The terminal first compares the illumination intensity acquired in the step 302 with the intensity threshold, and executes step 304 in response to determining that the illumination intensity is greater than the intensity threshold. Otherwise, the terminal determines the illustration information failing to meet a preset condition, and keeps the current state of the terminal screen as a state of awaiting unlocking.

Step 304: judging whether the duration of the illumination intensity is greater than a duration threshold in response to determining that the illumination intensity is greater than the intensity threshold.

In some embodiments, the duration threshold set by the user may be pre-stored in the terminal. Whether the duration of the illumination intensity is greater than the duration threshold set by the user is judged for illumination intensities greater than the intensity threshold. Here, the duration threshold may be, for example, 10 milliseconds. The illumination information meeting the preset condition is determined in response to determining that the duration of the illumination intensity greater than the intensity threshold is greater than the duration threshold, and otherwise the illumination information failing to meet the preset condition is determined.

Step 305: switching the current screen state of the terminal to a successfully unlocked state in response to determining that the duration of the illumination intensity greater than the intensity threshold is greater than the duration threshold.

Figure 4:
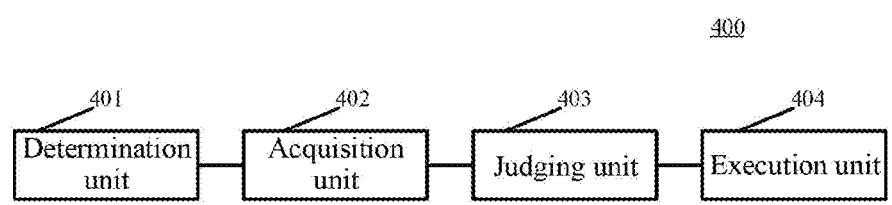
FIG. 4 is a schematic diagram of a structure of an embodiment of an apparatus for unlocking a terminal screen according to the disclosure.

Please further refer to FIG. 4. As an implementation of the method shown in FIG. 1, the disclosure provides an embodiment of an apparatus for unlocking a terminal screen. The embodiment of the apparatus corresponds to the embodiment of the method shown in FIG. 1, and the apparatus may be specifically applied to a variety of terminals.

As shown in FIG. 4, an apparatus 400 for unlocking a terminal screen according to the embodiment includes: a determination unit 401, an acquisition unit 402, a judging unit 403, and an execution unit 404. The determination unit 401 is configured for determining a current screen state of the terminal being a state of awaiting unlocking; the acquisition unit 402 is configured for acquiring illumination information of an environment of the terminal in a predetermined period of time, the illumination information including an illumination intensity and a duration of the illumination intensity; the judging unit 403 is configured for judging whether the illumination information meets a predetermined condition; and the execution unit 404 is configured for switching the current screen state of the terminal to a successfully unlocked state in response to determining that the illumination information meets the predetermined condition.

In some embodiments, the determination unit 401 may know whether the current state of the terminal is a state of awaiting unlocking based on, for example, current power consumption of the screen of the terminal.

In some optional implementations of the embodiment, the determination unit 401 invokes a system locking/unlocking function, and judges whether the current screen state is a state of awaiting unlocking based on a return value of the system locking/unlocking function in response to a first operation of a user on the terminal. For example, when the system of the terminal is an Android system, the terminal may use an inKeyguardRestrictedInputMode function in the Keyguardmanager category, and judge whether the terminal screen is in a state of awaiting unlocking based on a return value of the function. For example, when a flag return value acquired using an inKeyguardRestrictedInputMode function is a predetermined return value "true," it denotes the terminal screen being in the state of awaiting unlocking. There are two states of awaiting unlocking: a, the screen is turned off, and the terminal screen is in the state of awaiting unlocking; and b, the screen is turned on, and the terminal screen is in the state of awaiting unlocking. When the flag return value acquired using the method is "false," it denotes the terminal screen being in a successfully unlocked state. Here, the first operation may be, for example, a pressing operation of the user on a power button. In some application scenarios, the first operation may further be a voice inputted by a user into the first operation via an audio input device of the terminal, and the voice may contain a single phonetic symbol, or a plurality of phonetic symbols.

In some embodiments, the acquisition unit 402 first registers a monitor monitoring a parameter change event of the light sensor in the system. Taking an operating system running on the terminal being an Android operating system as an example, after the acquisition unit 402 registers a monitor monitoring a parameter change event of the light sensor in the system, when the Android operating system is running, the kernel of the Android operating system will monitor parameters of sensors, such as the light sensor, and will generate a broadcast message indicating a parameter change of the sensor when monitoring the parameter change of the sensor. In some embodiments, the monitor may receive the broadcast message indicating the parameter change of the light sensor of the terminal in real time. When receiving the broadcast message of the change of the light sensor, the monitor may acquire the illumination intensity of the environment of the terminal detected by the light sensor by invoking an application programming interface of the light sensor provided by the operating system running on the terminal. The monitor transfers the acquired illumination intensity to the acquisition unit 402.

Furthermore, the light sensor may further detect durations of ambient lights of different illumination intensities. The monitor may further acquire a duration of an environment of each illumination intensity by the API, and transfer the durations to the acquisition unit 402.

In some optional implementations of the embodiment, the acquisition unit 402 may acquire the illumination intensity of the environment in a predetermined period of time by the monitor. The illumination intensity of the environment may change a plurality of times in a predetermined period of time. The terminal of the acquisition unit 402 may acquire a plurality of illumination intensities, and the durations of the illumination intensities in the predetermined period of time by the monitor. Here, the predetermined period of time may be, for example, 10 seconds. In addition, the predetermined period of time may be set based on actual needs, and is not limited here.

In some optional implementations of the embodiment, the change regularity of the illumination intensity may be pre-stored in the apparatus 400 for unlocking a terminal screen. The change regularity may be, for example, two-dimensional values indicating relative illumination intensity changes, such as alternating values "0" and "1." The "1" here may represent, for example, a value of an illumination intensity greater than a preset threshold. The "0" here may represent, for example, a value of an illumination intensity smaller than a preset threshold. The threshold may be set based on an actual service environment, and is not limited here.

In some optional implementations of the embodiment, the apparatus 400 for unlocking a terminal screen may further include a statistical unit (not shown in the figure). The statistical unit is configured for collecting the change regularity of the illumination intensity based on the plurality of illumination intensities and the durations of the illumination intensities acquired by the acquisition unit 402 in the predetermined period of time. When collecting the change regularity of the illumination intensity, illumination intensities greater than the preset threshold may be regarded as "1," while illumination intensities smaller than the preset threshold may be regarded as "0." Then, the judging unit 403 further judges whether the change regularity of the illumination intensity collected by the statistical unit matches the change regularity preset by the user. The judging unit 403 determines the illumination information meeting the predetermined condition when the change regularity of the illumination intensity collected based on the plurality of illumination intensities and the durations of the illumination intensities acquired in the predetermined period of time matches the change regularity preset by the user. Otherwise, the judging unit 403 determines the illumination information failing to meet the predetermined condition.

In some optional implementations of the embodiment, the judging unit 403 determines whether each of the illumination intensities is greater than the intensity threshold set by the user respectively. The intensity threshold is pre-stored in the apparatus 400 for unlocking a terminal screen. The judging unit 403 further judges, when an illumination intensity is greater than the intensity threshold, whether the duration of the illumination intensity is greater than a duration threshold. The duration threshold may be, for example, 10 milliseconds. The judging unit 403 determines the illumination information including the illumination intensity and the duration thereof meeting the predetermined condition, when any one illumination intensity is greater than the intensity threshold, and the duration of the any one illumination intensity is greater than the duration threshold. Otherwise, the judging unit 403 determines the illumination information failing to meet the predetermined condition.

Figure 5:
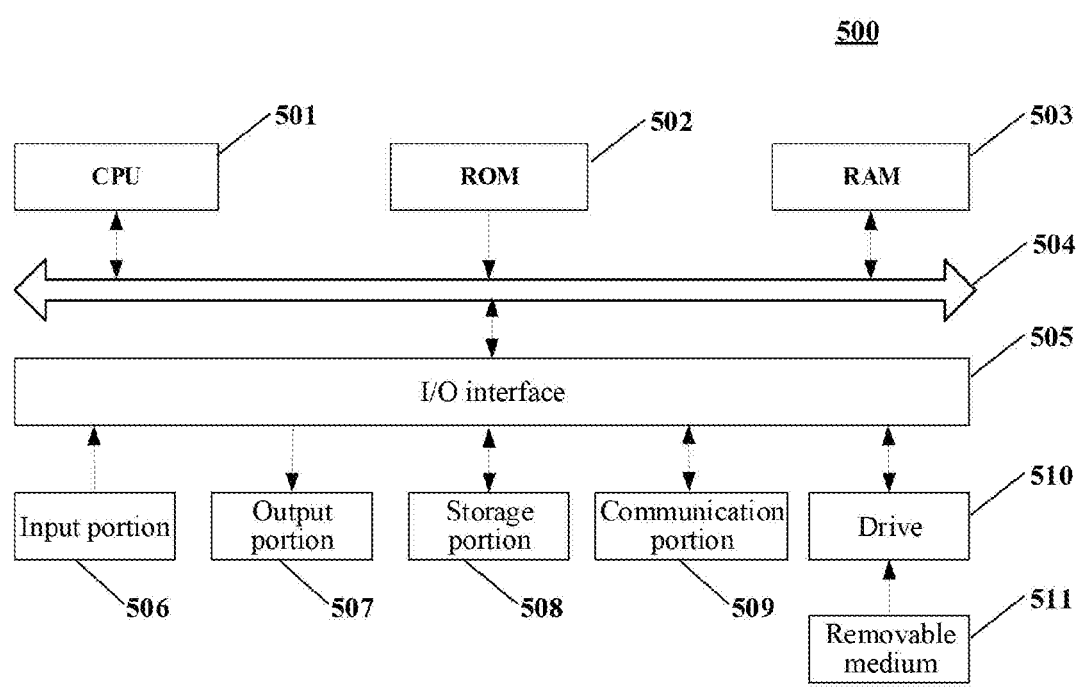
FIG. 5 is a schematic diagram of a structure of a computer system suitable for implementing a terminal device according to an embodiment of the disclosure.

Referring to FIG. 5, a schematic structural diagram of a computer system 500 adapted to implement a terminal device of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A drive 510 is also connected to the I/O interface 505 as required. A removable medium 511, such as a magnetic disk, an optical disk, a magneto-optical disk, and a semiconductor memory, may be installed on the drive 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

The flow charts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a determination unit, an acquisition unit, a judging unit, and an execution unit, where the names of these units or modules do not in some cases constitute a limitation to such units or modules themselves. For example, the determination unit may also be described as "a unit for determining a current screen state of the terminal being a state of awaiting unlocking."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: determine a current screen state of the terminal being a state of awaiting unlocking; acquire illumination information of an environment of the terminal in a predetermined period of time, the illumination information comprising an illumination intensity and a duration of the illumination intensity; judge whether the illumination information meets a predetermined condition; and switch the current screen state of the terminal to a successfully unlocked state in response to determining that the illumination information meets the predetermined condition.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for unlocking a terminal screen, the method comprising:
   determining a current screen state of the terminal being a state of awaiting unlocking;
   acquiring illumination information of an environment of the terminal in a predetermined period of time, the illumination information comprising a plurality of illumination intensities and a duration of each of the plurality of illumination intensities;
judging whether the illumination information meets a predetermined condition, including:
(i) judging whether each of the plurality of illumination intensities is greater than an intensity threshold;
(ii) judging whether the duration of each of the plurality of illumination intensities is greater than a duration threshold in response to determining that each of the plurality of illumination intensities is greater than the intensity threshold; and
(iii) determining that the illumination information meets the predetermined condition in response to determining that the duration of each of the plurality of illumination intensities is greater than the intensity threshold that has been determined to be is greater than the duration threshold; and
switching the current screen state of the terminal to a successfully unlocked state in response to determining that the illumination information meets the predetermined condition.

2. The method according to claim 1, wherein the method further comprises:
collecting change regularity of each of the plurality of illumination intensities based on the illumination information; and
the judging whether the illumination information meets a predetermined condition comprises:
judging whether the change regularity of each of the plurality of illumination intensities meets a predetermined change regularity; and
determining the illumination information meeting the predetermined condition in response to determining that the change regularity of each of the plurality of illumination intensities matches the predetermined change regularity.

3. The method according to claim 1, wherein the determining a current state of the terminal being a state of awaiting unlocking comprises:
invoking a system screen locking/unlocking function in response to a first operation of a user on the terminal; and
determining the current screen state being a state of awaiting unlocking in response to determining that a return value of the system screen locking/unlocking function is a predetermined return value; and
the first operation includes a pressing operation of the user on a power button.

4. An apparatus for unlocking a terminal screen, the apparatus comprising:
at least one processor; and
a memory storing instructions, the instructions when executed by the at least one processor, cause the at least one processor to perform operations, the operations comprising:
determining a current screen state of the terminal being a state of awaiting unlocking;
acquiring illumination information of an environment of the terminal in a predetermined period of time, the illumination information comprising a plurality of illumination intensities and a duration of each of the plurality of illumination intensities;
judging whether the illumination information meets a predetermined condition, including
(i) judging whether each of the plurality of illumination intensities is greater than an intensity threshold;
(ii) judging whether the duration of each of the plurality of illumination intensities is greater than a duration threshold in response to determining that each of the plurality of illumination intensities is greater than the intensity threshold; and
(iii) determining the illumination information meeting the predetermined condition in response to determining that the duration of each of the plurality of illumination intensities greater than the intensity threshold is greater than the duration threshold; and
switching the current screen state of the terminal to a successfully unlocked state in response to determining that the illumination information meets the predetermined condition.

5. The apparatus according to claim 4, wherein the operations further comprise:
collecting change regularity of each of the plurality of illumination intensities; and
the judging whether the illumination information meets a predetermined condition comprises:
judging whether the change regularity of each of the plurality of illumination intensities meets a predetermined change regularity; and
determining the illumination information meeting the predetermined condition in response to determining that the change regularity of each of the plurality of illumination intensities matches the predetermined change regularity.

6. The apparatus according to claim 4, wherein the determining a current state of the terminal being a state of awaiting unlocking comprises:
invoking a system screen locking/unlocking function in response to a first operation of a user on the terminal; and
determining the current screen state being a state of awaiting unlocking in response to determining that a return value of the system screen locking/unlocking function is a predetermined return value; and
the first operation includes a pressing operation of the user on a power button.

7. A non-transitory computer-readable storage medium storing a computer program, the computer program when executed by one or more processors, causes the one or more processors to perform operations, the operations comprising:
determining a current screen state of the terminal being a state of awaiting unlocking;
acquiring illumination information of an environment of the terminal in a predetermined period of time, the illumination information comprising a plurality of illumination intensities and a duration of each of the plurality of illumination intensities;
judging whether the illumination information meets a predetermined condition, including
(i) judging whether each of the plurality of illumination intensities is greater than an intensity threshold;
(ii) judging whether the duration of each of the plurality of illumination intensities is greater than a duration threshold in response to determining that each of the plurality of illumination intensities is greater than the intensity threshold; and
(iii) determining the illumination information meeting the predetermined condition in response to determining that the duration of each of the plurality of illumination intensities greater than the intensity threshold is greater than the duration threshold; and switching the current screen state of the terminal to a successfully unlocked state in response to determining that the illumination information meets the predetermined condition.

\* \* \* \* \*